United States Patent [19]

Nippa et al.

[11] Patent Number: 6,130,283
[45] Date of Patent: Oct. 10, 2000

[54] ALUMINUM HYDROXIDE, METHOD FOR PRODUCING THE SAME, AND METHOD OF USE OF THE SAME

[75] Inventors: Satoru Nippa; Toshiyuki Mizoe, both of Niihama, Japan

[73] Assignee: Sumitomo Chemical Company, Limited, Osaka, Japan

[21] Appl. No.: 08/857,465

[22] Filed: May 16, 1997

[30] Foreign Application Priority Data

May 16, 1996 [JP] Japan ..................................... 8-121942

[51] Int. Cl.$^7$ ................................ C01F 7/02; C01F 7/34; C08K 3/22; C08L 21/00
[52] U.S. Cl. ........................ 524/437; 423/626; 423/629; 523/150; 523/152; 152/905
[58] Field of Search ..................... 423/629, 626, 423/625; 523/150, 152, 153; 152/905; 524/437

[56] References Cited

U.S. PATENT DOCUMENTS

| | | | |
|---|---|---|---|
| 3,268,295 | 8/1966 | Armbrust, Jr. et al. | 423/625 |
| 3,376,106 | 4/1968 | Gring et al. | 423/628 |
| 3,395,221 | 7/1968 | Snyder et al. | 723/629 |
| 3,833,718 | 9/1974 | Reed et al. | 423/629 |
| 4,010,247 | 3/1977 | Wassermann et al. | 423/629 |
| 4,082,131 | 4/1978 | Scheller | 152/210 |
| 4,248,860 | 2/1981 | Watson | 424/57 |
| 4,574,074 | 3/1986 | Cristol et al. | 423/629 |
| 4,666,614 | 5/1987 | Block | 423/629 |
| 4,729,890 | 3/1988 | Stacey et al. | 423/628 |
| 4,780,307 | 10/1988 | Ben-Sasson | 423/626 |
| 4,882,140 | 11/1989 | Becker | 423/629 |
| 5,066,702 | 11/1991 | Hayashi et al. | 524/426 |
| 5,225,229 | 7/1993 | Martin et al. | 423/629 |
| 5,268,398 | 12/1993 | Nakagawa et al. | 523/158 |
| 5,378,753 | 1/1995 | Brown | 423/629 |
| 5,455,019 | 10/1995 | Inui et al. | 423/629 |
| 5,516,816 | 5/1996 | Samuels | 523/149 |
| 5,691,407 | 11/1997 | Azechi et al. | 524/437 |

FOREIGN PATENT DOCUMENTS

| | | | |
|---|---|---|---|
| 6-192484 | 7/1994 | Japan . | |
| 7-149950 | 6/1995 | Japan . | |
| 933640 | 6/1982 | U.S.S.R. | 423/629 |
| 1062124 | 3/1967 | United Kingdom | 423/629 |
| 1065733 | 4/1967 | United Kingdom | 423/629 |
| 1108125 | 3/1968 | United Kingdom | 423/629 |
| 1143787 | 2/1969 | United Kingdom . | |

OTHER PUBLICATIONS

English language abstract of JP 07149950 A.
English language abstract of JP 06192484 A.

*Primary Examiner*—Ngoc-Yen Nguyen
*Attorney, Agent, or Firm*—Birch, Stewart, Kolasch & Birch, LLP

[57] ABSTRACT

Aluminum hydroxide is disclosed, wherein a mean particle size of a secondary particle is from 0.1 to 8 $\mu$m, a BET specific surface area is not less than about 30 m$^2$/g and a pore size distribution has a maximum value within the range from 5 to 100 nm, a method for producing the same, and a method of using the same, comprising containing the same in a rubber, a method for using the same as a filler of a rubber composition for tire tread, and a rubber composition for tire tread using the same.

19 Claims, No Drawings

ALUMINUM HYDROXIDE, METHOD FOR PRODUCING THE SAME, AND METHOD OF USE OF THE SAME

FIELD OF THE INVENTION

The present invention relates to an aluminum hydroxide, a method for producing the same, a method of use of the same, and a rubber composition for tire tread using the same. More particularly, it relates to an aluminum hydroxide which can be applied to various uses such as fillers for paint, synthetic resin, adhesive, paper etc., and agents for paper making/painting, in addition to a main use as a rubber filler, etc., a method for producing the same, a method of using the same, comprising containing the same in a rubber, a method for using the same as a filler in a rubber composition for a tire tread, and a rubber composition for a tire tread using the same.

BACKGROUND OF THE INVENTION

Carbon black is generally used as a rubber reinforcing filler. However when using rubber containing carbon black as a tire tread, there are problems because resistance to rolling is increased and fuel consumption is increased.

On the other hand, with the improvement of automobile performance, the grip performance required for a tire has become more severe. As a conventional technique for solving these problems, it is known to use silica (white carbon) as a filler.

However, with filling silica, there arose problems with the reduction of rolling resistance. Also grip performance is not sufficient and the viscosity of the rubber and silica during kneading is high. Furthermore, the processability is insufficient, resulting in a deterioration of productivity.

An object of the present invention is to provide an aluminum hydroxide which can be used as a filler that can improve processability and productivity during kneading with a rubber for use as a tire tread while providing a sufficient reinforcing effect such as sufficient grip performance. It is another object of the present invention to provide a sufficient rolling resistance reduction effect when used as a filler in a rubber composition for a tire tread.

Under these circumstances, the present inventors have done intensive research in order to accomplish the above object. As a result, it has been found that aluminum hydroxide having a specific particle size, a specific BET specific surface area and a specific pore size can be used as a filler that satisfies the above object in whole or in part. It has also been found that this aluminum hydroxide can be obtained by mixing and neutralizing a basic solution and an acidic solution, one or both of the solutions containing an aluminum ion, under high-speed rotary shear stirring. Thus, the present invention has been accomplished.

SUMMARY OF THE INVENTION

The present invention provides an aluminum hydroxide wherein a mean particle size of a secondary particle is from 0.1 to 8 $\mu$m, a BET specific surface area is not less than about 30 $m^2/g$ and a pore size distribution has a maximum value within the range from 5 to 100 nm.

The present invention also provides a method for producing an aluminum hydroxide wherein a mean particle size of a secondary particle is from 0.1 to 8 $\mu$m, a BET specific surface area is not less than about 30 $m^2/g$ and a pore size distribution has a maximum value within the range from 5 to 100 nm, which comprises mixing and neutralizing a basic solution and an acidic solution, one or both of the solutions containing an aluminum ion, under high-speed rotary shear stirring, separating the resulting neutralization reaction product, followed by washing and further drying using a flash dryer, a hot-air transfer type dryer or a vacuum dryer.

The present invention also provides a method for using an aluminum hydroxide, which comprises adding aluminum hydroxide wherein a mean particle size of a secondary particle is from 0.1 to 8 $\mu$m, a BET specific surface area is not less than about 30 $m^2/g$ and a pore size distribution has a maximum value within the range from 5 to 100 nm in a rubber, and a method for using the aluminum hydroxide as a filler in a rubber composition for tire tread.

The present invention also provides a rubber composition for tire tread, comprising a rubber component and aluminum hydroxide wherein a mean particle size of a secondary particle is from 0.1 to 8 $\mu$m, a BET specific surface area is not less than about 30 $m^2/g$ and a pore size distribution has a maximum value within the range from 5 to 100 nm, the aluminum hydroxide being contained in a proportion of 10 to 200 parts by weight based on 100 parts by weight of the rubber component.

DETAILED DESCRIPTION OF THE INVENTION

Regarding the aluminum hydroxide of the present invention, a mean particle size of a secondary particle is from 0.1 to 8 $\mu$m, a BET specific surface area is not less than about 30 $m^2/g$ and a pore size distribution has a maximum value within the range from 5 to 100 nm. For example, the aluminum hydroxide is used as a filler in a tire tread rubber.

It is necessary that the BET specific surface area of the aluminum hydroxide of the present invention is not less than about 30 $m^2/g$, preferably from about 30 to 500 $m^2/g$, more preferably from about 50 to 350 $m^2/g$. When the BET specific surface area of the aluminum hydroxide is less than about 30 $m^2/g$, the reinforcing effect to the rubber is not obtained. On the other hand, the larger the BET specific surface area of the aluminum hydroxide becomes, the larger the reinforcing effect to the rubber. However, when it exceeds 350 $m^2/g$, the dispersion properties of the aluminum hydroxide are slightly deteriorated and the strength of the filled rubber is slightly lowered.

In the aluminum hydroxide of the present invention, the maximum value of the pore size distribution is within the range from about 5 to 100 nm, preferably from about 8 to 80 nm. The maximum value of the pore size distribution refers to a maximum value in an index pore size volume distribution chart measured by a mercury porosimeter method or a $N_2$ adsorption method. The maximum value of the pore size distribution within the range from about 5 to 100 nm is not necessarily the largest maximum value in the pore size distribution, and the aluminum hydroxide of the present invention may have another maximum value in addition to that within the range from about 5 to 100 nm. But when the maximum value of the pore size distribution only has a maximum value within the range less than about 5nm or the range more than about 100 nm, the desired reinforcing effect to the rubber is not obtained.

The mean particle size of the secondary particle of the aluminum hydroxide of the present invention is within the range from about 0.1 to 8 $\mu$m, preferably from about 0.1 to 5 $\mu$m. In the present invention, the mean particle size of the secondary particle may be measured by a centrifugal sedimentation mode having an acceleration rotation of 240 rpm/min, using a centrifugal sedimentation type particle size distribution measuring device, Model SA-CP3 (manufactured by Shimadzu Co.). A measuring solution may be prepared by suspending aluminum hydroxide as an object of the measurement in aqueous 0.2 wt % sodium hexametaphosphate, followed by subjecting it to an ultrasonic dispersion treatment for 10 minutes, and using the resulting solution for the measurement.

The primary particle size of the aluminum hydroxide of the present invention is within the range from about 10 to 100 nm. The primary particle size may be measured by using a field emission type scanning electron microscope, FE-SEM, Model S-4500 (manufactured by Hitachi Seisakusho Co.). Primary particle is the minimal unit of particles and readily agglomerates into secondary particle.

On the other hand, the aluminum hydroxide of the present invention may optionally be treated with various surface treating agents. The surface treating agents may be extremely effective means for improving dispersion properties when mixing the aluminum hydroxide of the present invention with a resin matrix such as rubber, etc. and for improving the adhesion properties of the interface between the aluminum hydroxide and resin. Examples of surface treating agents to be applied include known organic treating agents and inorganic dispersants. More specific examples thereof include various coupling agents, fatty acid metal salts, fatty acids, alcohols and the like.

The aluminum hydroxide of the present invention can be obtained by mixing and neutralizing a basic solution and an acidic solution, one or both of the solutions containing an aluminum ion, under high-speed rotary shear stirring, filtering the resulting neutralization reaction product, followed by washing and further drying using a flash dryer, a hot-air transfer type dryer or a vacuum dryer.

In the present invention, the high-speed rotary shear stirring refers to stirring due to mechanical energy (e.g. shear force, variation in pressure, cavitation, collision force, potential core, etc.) produced between a high-speed rotating turbine or rotor at a circumferential speed of about 1 to 40 m/sec and a stator or screen by using a stirrer such as homomixer, homogenizer, etc., that is, a stirrer comprising a high-speed rotating turbine or rotor, and a stator or screen provided on the peripheral part at a clearance of not more than 2 mm from the rotating part.

Examples of the high-speed rotary shear stirrer include T. K. Homomixer, T. K. Homomic inlineflow, Homojetter M (the above stirrers are manufactured by Tokushu Kika Kogyo Co., Ltd.), Cleamix (manufactured by M. Technic Co., Ltd.), Polytron homogenizer, Megatron homogenizer (manufactured by KINEMATICA Co.), Supraton (manufactured by Tsukishima Kikai Co., Ltd.) and the like.

Regarding the conditions of these high-speed rotary shear stirrers, the shear rate can be represented by $x/y \times 10^3$ sec$^{-1}$ wherein a circumferential speed of a high-speed rotating turbine or rotor is x m/sec and a clearance between the turbine or rotor and a stator or screen is y mm.

The high-speed rotary shear stirring in the present invention refers to high-shear stirring capable of producing a shear rate of not less than about 1000 sec$^{-1}$. When the shear rate is less than about 1000 sec$^{-1}$, mixing of two solutions, i.e. basic solution and acidic solution, and the mechanical dispersion of the resulting aluminum hydroxide particle-containing slurry are insufficient so that a coarse agglomerate is liable to be formed.

Since the neutralization reaction between the basic solution and acidic solution takes place at a very fast rate, the aluminum hydroxide is momentarily deposited in the reaction. Therefore, when the neutralization reaction is conducted by using typical screw type low-speed and moderate-speed rotary stirrers, a coarse agglomerate is liable to be formed. On the other hand, when the neutralization reaction between the basic solution and acidic solution is conducted under high-speed rotary shear stirring, uniform mixing of two solutions is rapidly conducted. Therefore, generation of the coarse particles caused by local non-uniform mixing of the basic solution and acidic solution is reduced, and an ultrafine aluminum hydroxide can be obtained.

Examples of the device used in the reaction include a batch device and a continuous reaction device. The addition order of the solutions and time required for the addition are not specifically limited.

As the batch device, those comprising a tank as a reaction vessel, with a high-speed rotary shear stirring device being provided in the tank, are generally used. When using the above device, it is possible to use a method of previously discharging an alkali aluminate solution or an acidic solution into the reaction vessel and adding dropwise the acidic or basic solution under the high-speed rotary shear stirring, to use a method of previously charging a dispersion medium such as water into the reaction vessel and simultaneously adding the basic and acidic solution to the dispersion medium under the high-speed rotary shear stirring. In the case of the latter method, there can also be used a method of previously adjusting the pH of the dispersion medium to be discharged into the reaction vessel to a predetermined value and adding the basic and acidic solutions while maintaining the pH.

Examples of the continuous device include a tank continuous type device and a pipeline continuous type device. The tank continuous type device comprises a tank equipped with a high-speed rotary shear device, and a method of continuously supplying the basic and acidic solutions into the tank and getting the deposited aluminum hydroxide together with the solution after the reaction through an outlet. The pipeline continuous type device comprises a high-speed rotary shear stirrer incorporated into a line, and a method of continuously supplying the basic and acidic solutions into the line.

In the present invention, the reaction temperature under the high-speed rotary shear stirring is preferably maintained at about 0 to 50° C., more preferably about 0 to 30° C. In the neutralization reaction of sodium aluminate, when the reaction temperature increases, crystal growth is remarkably accelerated and a particle having a large primary particle size is obtained. Therefore, when the reaction temperature becomes higher than 50° C., aluminum hydroxide having a small specific surface area, wherein the primary particle is grown, is liable to be formed.

In the present invention, the degree of neutralization of the neutralization reaction is not specifically limited. It is possible to use any conditions such as neutral conditions excess acidic solution, or excess basic solution. Any conditions such as excess acidic solution, neutral conditions or excess basic solution can be selected according to the use of the resulting aluminum hydroxide.

The type of basic solution used in the neutralization reaction is not specifically limited.

Examples of the basic solution include solutions of sodium hydroxide, potassium hydroxide, aqueous ammonia and the like, and examples of the basic solution containing an aluminum ion include solutions of sodium aluminate, potassium aluminate and the like.

The concentration of the basic solution used is not specifically limited. For example, when using the alkali aluminate solution, the aluminum concentration of the basic solution is preferably from about 5 to 400 g/l, more preferably from about 15 to 250 g/l, in terms of $Al_2O_3$. When using the sodium aluminate solution, the molar ratio of $Na_2O$ of the sodium aluminate solution to the $Al_2O_3$ is preferably within the range from about 1.0 to 10, more preferably from about 1.4 to 8.

When the aluminum concentration of the alkali aluminate solution is high, particle growth rate is fast and the rate of agglomeration is accelerated. Therefore, it may be impossible to obtain particles which are highly dispersed and contain no coarse particles. On the other hand, when the aluminum concentration of the alkali aluminate solution is low, the weight of the aluminum hydroxide to be deposited is low and the productivity may be lowered.

Examples of the alkali aluminate solution include solution of sodium aluminate, potassium aluminate and the like. Among them, sodium aluminate, which is generally used in the Bayer process of obtaining alumina from bauxite, is preferably used in view of its availability and economical efficiency.

On the other hand, the acidic solution is not specifically limited, and an inorganic or organic acid is used. Examples of inorganic acids include sulfuric acid, hydrochloric acid, nitric acid, phosphoric acid, perchloric acid, boric acid and the like, and examples of organic acid include carboxylic acids such as formic acid, acetic acid, propionic acid, etc.; dicarboxylic acid such as oxalic acid, etc.; and hydroxycarboxylic acid such as gluconic acid, etc.

As the acidic solution containing an aluminum ion, there can be used a solution of an inorganic salt such as aluminum sulfate, aluminum nitrate, etc. and a solution of an organic salt such as aluminum acetate, etc.

Aluminum hydroxide is deposited as the neutralization reaction product by subjecting the basic solution and acidic solution to the stirring, mixing and neutralizing treatments according to the above method. In the present invention, the aluminum hydroxide is obtained by solid-phase separation such as filtration, washed, and then dried using a flash dryer, a hot-air transfer type dryer or a vacuum dryer.

The dryer is generally classified into the following eight kinds based on the mechanism, i.e. (1) material standing type dryer, (2) material transfer type dryer, (3) material stirring type dryer, (4) hot-air transfer type dryer, (5) cylindrical dryer, (6) infrared dryer, (7) vacuum dryer and (8) high-frequency dryer (Chemical Engineering Handbook, Maruzen). The flash dryer is a dryer utilizing flash vaporization (self-vaporization), which is not within the range of a conventional dryer.

The flash dryer in the present invention is a dryer having such a construction that a solvent is evaporated by pressure-spraying a solution heated to a temperature higher than boiling point at atmospheric pressure through an outlet, thereby obtaining a solid particle.

The hot-air transfer type dryer in the present invention refers to a dryer for drying a liquid-containing powder such as slurry in hot air at high temperature. Specifically, a fluidized bed dryer, an airborne dryer and a spray dryer correspond to the hot-air transfer type dryer. Examples of the fluidized bed dryer include slurry dryer, conduction flow (both dryers are manufactured by Okawara Seisakusho Co., Ltd.) and medium fluid dryer (manufactured by Nara Kikai Seisakusho Co., Ltd.). Examples of the airborne dryer include flash jet dryer (manufactured by Kurimoto Tekko Co., Ltd. and Seishin Kigyo Co., Ltd.). Examples of the spray dryer include Spray dryer (manufactured by Sakamoto Giken Co., Ltd., Nara Kikai Seisakusho Co., Ltd. and Okawara Kakoki Co., Ltd.) and Mobile minor (manufactured by Niro A/S).

Furthermore, the vacuum dryer is a device for drying by optionally cooling or heating a material to be dried under a vacuum atmosphere. Examples of the vacuum dryer include MZ processor, Belmax (both dryers are manufactured by Okawara Seisakusho Co., Ltd.), vacuum rotary dryer (manufactured by Tokuju Kosakusho Co., Ltd.) and Vacuum tumble dryer (manufactured by Kusunoki Seisakusho Co., Ltd.).

In the present invention, aging can be optionally conducted after the neutralization reaction. The crystal form and particle form of the aluminum hydroxide can be modified by aging. When the aluminum hydroxide after aging is used, for example, as a resin filler, it shows improved dispersion and reinforcing properties in comparison with the case where aluminum hydroxide before aging is used. The method of aging is not specifically limited, and examples thereof include a method of aging the neutralization reaction product immediately after depositing , a method comprising separating the neutralization reaction product from the reaction solution, optionally washing the separated product, followed by immersing in a separately prepared solution to conduct aging and the like. Examples of the aging conditions include changing the temperature variously under a normal pressure, conducting aging under elevated pressure and the like. The aging is generally conducted by maintaining mixing at preferably about 0 to 60° C. under a normal pressure for preferably about 30 minutes to about one week.

In the present invention, a water-soluble polymer can also be allowed to coexist at the time of mixing under the high-speed rotary shear stirring. The water-soluble polymer is adsorbed on the surface of the deposited aluminum hydroxide particle to make particles repulse each other, thereby imparting the dispersion effect. As the water-soluble polymer, a polyacrylate is preferably used in an acidic to neutral solution and a polyacrylamide is preferably used in a neutral to basic solution.

In the present invention, the aluminum hydroxide may optionally be subjected to a grinding treatment. In this case, since the agglomerated particle can be nearly ground into a primary particle, improved dispersion properties can be obtained. The grinding may be carried out by using a known grinding device. In case of wet grinding, there can be used Wet tower mill (manufactured by Kubota Co., Ltd.), Apex mill (manufactured by Kotobuki Giken Kogyo Co., Ltd.), Micros (manufactured by Nara Kikai Seisakusho Co., Ltd.), Dyno-mill (manufactured by Kabushikikaisha Shinmaru enterprise) and the like. As a dry mill, there can be used Jet mills (manufactured by Seishin Kigyo, Nihon Newmatic Kogyo Co., Ltd. or Nisso Engineering Co., Ltd.), Current jet mill (manufactured by Nisshin Engineering Co., Ltd.), Counter jet mill (manufactured by Hosokawa Micron Co., Ltd.) Kolloplex (manufactured by Hosokawa Micron Co., Ltd.), pin mill, vibration mill, ball mill and the like.

The aluminum hydroxide of the present invention is preferably used in a rubber composition for tire tread. As a rubber component used in the rubber composition for tire tread, there can be used those which are known in the corresponding field, such as cis-1,4-polyisoprene, low cis-1,4-polybutadiene, ethylene-propylene-diene rubber, chloroprene, halogenated butyl rubber, acrylonitrile-butadiene rubber, natural rubber, etc., in addition to styrene-butadiene rubber. The amount of the aluminum hydroxide added to the rubber component varies depending on the amount of the rubber component used as a raw material and other inorganic fillers used in combination, but the aluminum hydroxide is normally used in an amount within the range from about 10 to 200 parts by weight based on 100 parts by weight oftherubbercomponent. It is possibletooptionallycontain inorganic fillers (e.g. carbon black, silica, talc, clay, etc.), process oils, silane coupling agents, vulcanization agents, antioxidants, etc. in the rubber composition for tire tread, in addition to the aluminum hydroxide of the present invention.

The rubber composition for tire tread thus obtained can improve the grip performance and reduce the rolling resistance. Furthermore, the rubber composition has a low viscosity when kneading the rubber with the aluminum hydroxide in comparison to kneading the rubber with silica, and it is also superior in processability.

As described hereinabove, the aluminum hydroxide of the present invention has a specific mean particle size of a secondary particle, a specific BET specific surface area and a specific pore size distribution, and has the following effect. That is, when the aluminum hydroxide of the present invention is filled in a rubber composition for tire tread, the effect of improving the grip performance and reducing the rolling resistance is imparted to the rubber composition and, at the same time, the viscosity when kneading the rubber with the aluminum hydroxide is reduced, thereby improving the processability and productivity. Thus, the industrial utilization value thereof is great.

The following Examples further illustrate the present invention in detail but are not to be construed to limit the scope thereof. In the present invention, powder physical properties and physical properties of the rubber-filled composition were measured in the following manner.

BET specific surface area: It was measured by a fluidized specific surface area automatic measuring device (manufactured by Shimadzu Co., trade name: Flow Soap II2300PC-1A).

Mean particle size of the secondary particle: It was measured by a centrifugal sedimentation mode having an acceleration rotation of 240 rpm/min, using a centrifugal sedimentation type particle size distribution measuring device, Model SA-CP3 (manufactured by Shimadzu Co.). A measuring solution was prepared by suspending aluminum hydroxide as an object of the measurement in aqueous 0.2 wt % sodium hexametaphosphate, followed by subjecting it to an ultrasonic dispersion treatment for 10 minutes, and using the resulting solution for the measurement.

Pore size: A value of less than 3.2 nm was measured by the $N_2$ adsorption method and that of not less than 3.2 nm was measured by the mercury porosimeter method (Autoscan 33 manufactured by Cantacrom Co.).

Gripperformance: Atan δ-temperature dispersioncurve was obtained by measuring under a frequency of 10 Hz, an initial strain of 10%, an amplitude of ±0.25% and a heating rate of 2° C./minute according to JIS K-6394, and a tan δ at 0° C. in the dispersion curve was determined. Here, tan δ indicates a ratio of a storage elastic modulus G' to a loss elastic modulus G", i.e. G"/G'. The resulting measured value was indicated by a relative value in case of the measured value of the rubber-filled composition obtained in Comparative Example 1 being 100. The smaller this relative value, the better the grip performance is.

Rolling resistance: A tan δ at 60° C. in the tan δ-temperature dispersion curve obtained under the above conditions according to JIS K-6394 was determined. The resulting measured value was indicated by a relative value in case of the measured value of the rubber-filled composition obtained in Comparative Example 1 being 100. Thes maller this relative value, the lower the rolling resistance is.

Processability: In case of preparing a rubber composition containing aluminum hydroxide, a torque obtained immediately before the completion of the kneading of the rubber and aluminum hydroxide was read, and the processability was evaluated from the resulting value. The resulting measured value was indicated by a relative value in case of the measured value of the rubber-filled composition obtained in Comparative Example 1 being 100. Thesmallerthis relative value, the better the processability is.

EXAMPLE 1

(Production of Aluminum Hydroxide)

To 1 liter of a sodium aluminate solution [sodium concentration: 125 g/l in terms of $Na_2O$, molar ratio $Na_2O/Al_2O_3$: 1.55] as a basic solution in a stainless steel tank equipped with a baffle, 600 ml of an aqueous aluminum sulfate solution (aluminum concentration: 5.3% by weight in terms of $Al_2O_3$) as an acidic solution was added with ice-cooling while stirring under the conditions of a shear rate of 11000 $sec^{-1}$, using a Homomixer (manufactured by Tokushu Kika Kogyo Co., Ltd., trade name: T. K. Homojetter, Model M) over about 3 minutes, to conduct the neutralization reaction. Stirring was continued for 15 minutes after the addition to obtain an aluminum hydroxide slurry. During the neutralization reaction, an ultimate temperature was 15° C.

The aluminum hydroxide slurry thus obtained was centrifuged to recover only a solid content, and the step of suspending the solid content in 2 liter of deionized water, followed by solid-phase separation, was repeated seven times. Then, the resultant was washed with deionized water (total amount of about 14 liter). The wet cake after washing was dispersed in water again to adjust the cake concentration to 6%, and then dried by Spray dryer (manufactured by Niro A/S, trade name: Mobile minor type) under the conditions of a drying temperature of 250° C. (dryer inlet temperature) and 100° C. (dryer outlet temperature) and an atomizer pressure of 1.2 kg/cm² to obtain an aluminum hydroxide powder. Powder physical properties of the resulting aluminum hydroxide powder are shown in Table 1.

EXAMPLE 2

According to the same manner as that described in Example 1 except for changing the raw materials used for neutralization to 533 ml of a sodium aluminate solution (sodium concentration: 125 g/l in terms of $Na_2O$, molar ratio $Na_2O/Al_2O_3$: 1.55) and 880 ml of an aqueous aluminum sulfate solution (aluminum concentration: 3.2% by weight in terms of $Al_2O_3$), an aluminum hydroxide powder was obtained. Powder physical properties of the resulting aluminum hydroxide powder are shown in Table 1.

EXAMPLE 3

An aluminum hydroxide slurry was obtained in the same manner as in Example 1, except that the stirring was conducted under the conditions of the shear rate of 11000 $sec^{-1}$ for 15 minutes after the neutralization reaction, followed by stirring under the conditions of the shear rate of 3300 $sec^{-1}$ for additional 2 hours to conduct aging. The temperature after aging was 8° C. The resulting aluminum hydroxide slurry was washed and then dried according to the same manner as that described in Example 1 to obtain an aluminum hydroxide powder. Powder physical properties of the resulting aluminum hydroxide powder are shown in Table 1.

EXAMPLE 4

(Preparation of Rubber Composition Containing Aluminum Hydroxide)

137.5 Parts by weight of SBR (styrene content/vinyl unit content in butadiene=30/50 (wt %/%), Aroma-oil: 37.5 parts by weight, Mooney viscosity $ML_{1+4}$ 100° C.: 55, solution polymerized styrene-butadiene rubber containing about 60% by weight of branched moiety which is attributed to $SiCl_4$ added at the time of producing), 78.4 parts by weight of an aluminum hydroxide (each one obtained in Examples 1 to 3), 10.1 parts by weight of an Aroma-oil (manufactured by Kyodo Sekiyu Co., Ltd., trade name: X-140) and 12.8 parts by weight of a silane coupling agent (manufactured by Degussa AG, trade name: X-505) were introduced in a Labo plastomill (manufactured by Toyo Seiki Seisakusho Co., Ltd., type: 30-C150, mixer type: B-75) whose temperature has previously been set to 110° C., in this order, and kneaded at a blade revolution of 80 rpm for 3 minutes. After the blade revolution was raised to 100 rpm, the mixture was further kneaded for 2 minutes to obtain a rubber composition containing an aluminum hydroxide.

The composition was vulcanized at 160° C. for 45 minutes and physical properties of the resulting vulcanized product were measured. The results are shown in Table 1.

Comparative Example 1

According to the same manner as that described in Example 4 except for using White Carbon (manufactured by Degussa Co., trade name: Ultrasil VN3 GR) in place of the aluminum hydroxide, a composition comprising the rubber and White Carbon was obtained.

The composition was vulcanized at 160° C. for 45 minutes and physical properties of the resulting vulcanized product were measured. The results are shown in Table 1.

Comparative Example 2

According to the same manner as that described in Example 4 except for using a commercially available aluminum hydroxide (manufactured by Sumitomo Chemical Industries Co., Ltd., trade name: C-301) as the aluminum hydroxide in case of preparing the rubber composition containing the aluminum hydroxide, a rubber composition containing an aluminum hydroxide was obtained. The composition was vulcanized at 160° C. for 45 minutes and physical properties of the resulting vulcanized product were measured. The results are shown in Table 1.

TABLE 1

|  | Example 1 | Example 2 | Example 3 | Comparative example 1 | Comparative example 2 |
|---|---|---|---|---|---|
| Powder physical properties |  |  |  |  |  |
| BET specific surface area ($m^2/g$) | 60 | 250 | 95 | 170 | 5 |
| Maximum value in pore size distribution (nm) | 30 | 12 | 14 | 25 | 300 |
| Mean particle size of secondary particle ($\mu$) | 1.9 | 2.5 | 1.3 | — | 1.0 |
| Vulcanized product physical properties |  |  |  |  |  |
| Grip performance | 50 | 32 | 41 | 100 | 90 |
| Rolling resistance | 47 | 53 | 56 | 100 | 59 |
| Processability | 51 | 59 | 54 | 100 | 52 |

What is claimed is:

1. An aluminum hydroxide wherein a mean particle size of a secondary particle is from 0.1 to 8 $\mu$m, a BET specific surface area is not less than about 30 $m^2/g$ and a pore size distribution has a maximum value within the range from 8 to 80 nm.

2. The aluminum hydroxide according to claim 1, which is obtained by mixing and neutralizing a basic solution and an acidic solution, one or both of the solutions containing an aluminum ion, under high-speed rotary shear stirring, separating the resulting aluminum hydroxide as the neutralization reaction product, followed by washing and further drying using a flash dryer, a hot-air transfer type dryer or a vacuum dryer.

3. The aluminum hydroxide according to claim 1, wherein the pore size distribution has a maximum value within the range from 12 to 80 nm.

4. An aluminum hydroxide according to claim 1, wherein a mean particle size of a secondary particle is from 0.1 to 5 $\mu$m.

5. An aluminum hydroxide according to claim 1, wherein a mean particle size of a secondary particle is from 0.1 to 2.5 $\mu$m.

6. An aluminum hydroxide wherein a mean particle size of a secondary particle is from 0.1 to 8 $\mu$m, a BET specific surface area is not less than about 30 $m^2/g$ and a pore size distribution has a maximum value within the range from 8 to 80 nm, wherein said secondary particle contains primary particles therein of aluminum hydroxide, wherein said primary particles have a particle size within a range of about 10 to 100 nm.

7. A method for producing aluminum hydroxide having a mean secondary particle size from 0.1 to 8 $\mu$m, a BET specific surface area of not less than about 30 $m^2/g$ and a pore size distribution having a maximum value within the range from 8 to 80 nm, which comprises mixing and neutralizing a basic solution and an acidic solution, one or both of the solutions containing an aluminum ion, under high-speed rotary sheer stirring, separating the resulting aluminum hydroxide as the neutralization reaction product, and drying the product using a flash dryer, a hot-air transfer type dryer or a vacuum dryer, wherein the high-speed stirring is a high shear condition for producing a shear rate of not less then 1000 $sec^{-1}$.

8. A method according to claim 7, wherein after the separating step the resulting neutralization reaction product is washed before the drying step.

9. The method according to claim 7, wherein the basic solution is an aqueous solution of alkali aluminate, sodium hydroxide, potassium hydroxide or ammonia.

10. The method according to claim 7, wherein the acidic solution is an aqueous solution of aluminum sulfate, sulfuric acid, hydrochloric acid or acetic acid.

11. The method according to claim 7, wherein a water-soluble polymer is allowed to coexist at the time of mixing and neutralizing under high-speed rotary shear stirring.

12. The method according to claim 7, wherein a reaction temperature is within the range from 0 to 50° C. at the time of mixing and neutralizing under high-speed rotary shear stirring.

13. The method according to claim 7, wherein the aluminum hydroxide obtained after the neutralization reaction is aged.

14. The method according to claim 7, wherein the resulting neutralization reaction product is subjected to a grinding treatment at any stage from the mixing and neutralizing under high-speed rotary shear mixing to the drying.

15. A method for using aluminum hydroxide, which comprises: containing the aluminum hydroxide wherein a mean particle size of a secondary particle is from 0.1 to 8 µm, a BET specific surface area is not less than about 30 m$^2$/g and a pore size distribution has a maximum value within the range from 5 to 80 nm in a rubber composition.

16. The method according to claim 15, wherein the aluminum hydroxide is used as a filler in a rubber composition for tire tread.

17. The method according to claim 15 or 16, wherein the aluminum hydroxide is contained in a proportion of 10 to 200 parts by weight based on 100 parts by weight of the rubber component.

18. A rubber composition for tire tread, comprising a rubber component and aluminum hydroxide wherein a mean particle size of a secondary particle is from 0.1 to 8 µm, a BET specific surface area is not less than about 30 m$^2$/g and a pore size distribution has a maximum value within the range from 8 to 80 nm, and wherein the aluminum hydroxide is contained in a proportion of 10 to 200 parts by weight based on 100 parts by weight of the rubber component.

19. A tire having a tread comprising a rubber component and aluminum hydroxide according to claim 1 or 2.

* * * * *